(12) United States Patent
Cahall

(10) Patent No.: US 6,785,054 B1
(45) Date of Patent: Aug. 31, 2004

(54) OPTICAL MAGNIFIER SUITABLE FOR USE WITH A MICRODISPLAY DEVICE

(75) Inventor: Scott C. Cahall, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/373,472

(22) Filed: Feb. 24, 2003

(51) Int. Cl.[7] .............................................. G02B 25/00
(52) U.S. Cl. ........................................ 359/646; 359/643
(58) Field of Search ................................ 359/643–647, 359/717, 793, 794, 570, 802

(56) References Cited

U.S. PATENT DOCUMENTS

| | | | | |
|---|---|---|---|---|
| 4,094,585 A | * | 6/1978 | Betensky | 359/646 |
| 5,835,279 A | | 11/1998 | Marshall et al. | 359/645 |
| 5,886,825 A | | 3/1999 | Bietry | 359/645 |
| 5,909,322 A | * | 6/1999 | Bietry | 359/646 |
| 6,130,785 A | * | 10/2000 | Abe et al. | 359/646 |
| 6,469,836 B1 | * | 10/2002 | Yamamoto et al. | 359/646 |

* cited by examiner

Primary Examiner—Georgia Epps
Assistant Examiner—M. Hasan
(74) Attorney, Agent, or Firm—William R. Zimmerli

(57) ABSTRACT

An optical magnifier is provided. One general form of one example embodiment includes two lens elements, at least two aspheric surfaces, and at least one diffractive surface. Another general form of another example embodiment includes three lens elements, and at least three aspheric surfaces. At least two of the aspheric surfaces can be simple conics. The optical magnifier, suitable for use in an electronic display system, has an apparent field of view of at least +/−10 degrees; a magnification of at least 15x; a back focal length of at least 5 mm; and an eye relief greater than the effective focal length of the optical magnifier. The lens elements can be made from plastic.

60 Claims, 11 Drawing Sheets

OPTICAL MAGNIFIER SUITABLE FOR USE WITH A MICRODISPLAY DEVICE

FIELD OF THE INVENTION

This invention relates generally to optical systems and in particular to optical magnifiers incorporated into and/or used in conjunction with other optical components.

BACKGROUND OF THE INVENTION

Optical Magnifiers (also referred to as "eyepieces" or "loupes") are known. Typically, these optical devices are used to allow direct viewing of slides or other small objects or are used as part of other optical systems such as, for example, telescopes and viewfinders.

Conventional optical magnifiers utilize magnifier lenses that provide an enlarged virtual image of a real object in front of a viewer's eye. It is generally preferable that such lenses, in combination with the object being viewed, provide an apparent field of view to the user in excess of +/−10 degrees, in order to avoid the sensation of "tunnel vision". Additionally, these magnifier lenses preferably provide a relatively long eye relief (that is, the distance at which the lens can be held from the eye) in order to allow an object to be comfortably viewed.

Optical magnifiers have also been suggested for viewing electronic displays incorporated, for example, in portable electronic devices. When used to view electronic displays, the same criteria, described above, applies, even though newer high quality micro-displays are now being manufactured with full diagonals of 6 mm or less. In order to obtain a +/−10 degree apparent field of view, such small microdisplays require a high magnification lens (on the order of 15× or greater), which translates to an effective focal length of approximately 17 mm or less. As is known, magnification for this type of optical system is calculated using the standard formula: M=254 mm/EFL, where EFL is the effective focal length of the lens, measured in mm.

For comfortable viewing by users, including those wearing eyeglasses, it is generally accepted that a reasonable eye relief is approximately 17 mm or greater. As such, in the relative sense, the eye relief should preferably be at least as great as the EFL of the lens (for example, 17 mm in the 15× example described above) for micro-displays of this size. This relationship between eye relief and EFL becomes even more of a concern when shorter focal length (higher magnification) systems are contemplated. This is a new and challenging goal that did not previously exist for larger electronic displays used with correspondingly lower magnification lenses.

In U.S. Pat. No. 4,094,585, E. I. Betensky discloses a three-element all-plastic optical magnifier comprising from the viewing end, a first positive lens group comprising a single element, and a second lens group comprising a bi-convex element and a bi-concave element forming a doublet having the overall shape of a meniscus. This magnifier has a magnification in the range of 13× to 14×. For micro-displays with fill diagonals of less than 6 mm, this magnifier does not provide the desired +/−10 degree field of view. Additionally, this magnifier has the added labor expense of cementing two elements to form a doublet, which may be unacceptable for cost-sensitive applications.

In U.S. Pat. No. 5,835,279, I. Marshall and R. Holmes disclose a three-clement all-plastic magnifier lens for viewing an LCD in the binocular vision system of a head-mounded display unit. This design has a large (+/−35.8 degree) apparent field of view and a long (17 mm) eye relief. However, the LCD is quite large (33.65 mm full diagonal) and the resulting magnification is only about 11×, making it unsuitable for use with micro-displays of the scale contemplated here. Additionally, when this system is scaled to a magnification of 15×, the eye relief drops to about 12.4 mm, quite short for users wearing eyeglasses.

In U.S. Pat. Nos. 5,909,322 and 5,886,825, J. R. Bietry discloses two- and three-element plastic designs for magnifier lenses suitable for use in liquid crystal (LCD) or light emitting diode (LED) micro-display systems. Although these lenses have a magnification of 16×, high image quality, and long eye relief, these designs contain at least one diffractive surface, for both the two element and three element forms and/or include a rear meniscus lens which is concave toward the object and positionable within 5 mm of the object surface. As a number of newer "micro-display" devices, for example, LCD devices, depend on light being delivered from the front of the display via a polarizing beam splitting device, a back focal length (BFL) of the lens in excess of 5 mm is often essential for the placement of the optical magnifier. For micro-displays which require a BFL in excess than 5 mm, these designs will simply not function.

SUMMARY OF THE INVENTION

According to one aspect of the present invention, a magnifier lens comprises in order from an eye side a first positive power meniscus lens element having an eye side surface and an object side surface with at least one of the eye side surface and the object side surface is aspheric; and a second positive power lens element having an aspheric object side surface convex toward the object side and an eye side surface, wherein at least one of the object side surface of the first positive power meniscus element and the eye side surface of the second positive power element is diffractive.

According to another aspect of the invention, an optical system comprises in order from an eye side a first positive power meniscus lens element having an eye side surface and an object side surface with at least one of the eye side surface and the object side surface being aspheric; a second positive power lens element having an aspheric object side surface convex toward the object side and an eye side surface, wherein at least one of the object side surface of the first positive power meniscus element and the eye side surface of the second positive power element is diffractive; and an object to be viewed.

According to another aspect of the invention, a magnifier lens comprises in order from an eye side a first positive power lens element having an aspheric eye side surface; a second negative power meniscus lens element having an aspheric object side surface; and a third positive power bi-convex lens element having at least one aspheric surface.

According to another aspect of the invention, an optical system comprises in order from an eye side a first positive power lens element having an aspheric eye side surface; a second negative power meniscus lens element having an aspheric object side surface; a third positive power bi-convex lens element having at least one aspheric surface; and an object to be viewed.

According to another aspect of the invention, a magnifier lens comprises in order from an eye side a first positive power lens element having an aspheric surface; and a second positive power lens element having an aspheric surface, the magnifier lens having a back focal length in air, wherein the back focal length of the magnifier lens in air is greater than 5 mm.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

Figure 1:
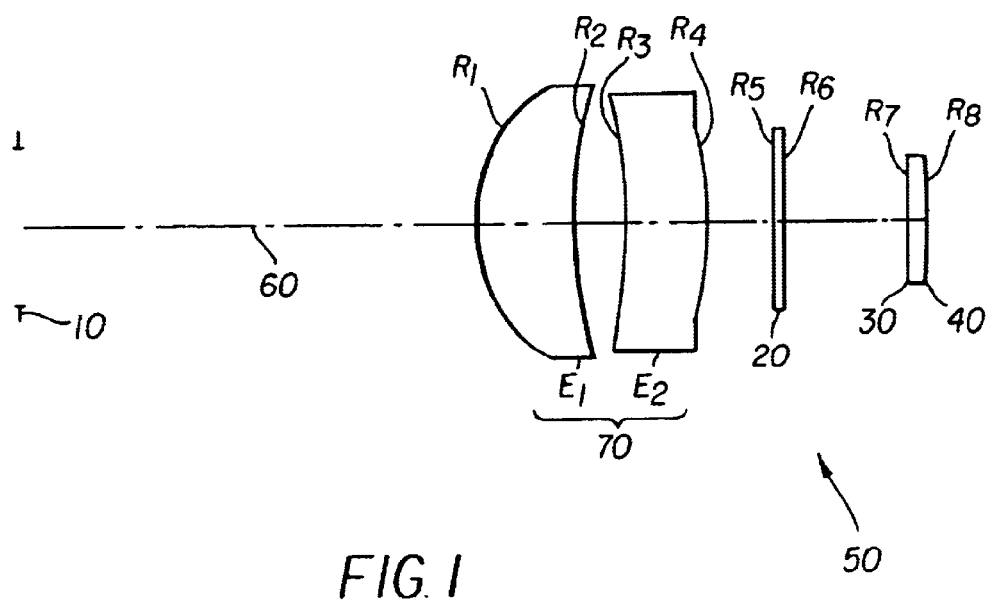
FIG. 1 shows a sectional view of a first embodiment of the magnifier lens system of the first general form.

The present description will be directed in particular to elements forming part of, or cooperating more directly with, apparatus in accordance with the present invention. It is to be understood that elements not specifically shown or described may take various forms well known to those skilled in the art.

In the following descriptions of example embodiments of the invention, the term magnifier lens is used to describe an optical system. However, a person skilled in the art will understand that the magnifier lens(es) described herein can be used as, for example, an eyepiece with other optical components. As such, the term magnifier lens should not be considered limited to any particular application. Note, that since that light can be directed through the magnifier lens in any direction, the eye position can be replaced by a galvanometer or a rotating polygon with some minor distortion adjustments. Thus, a magnifier lens constructed according to the present invention can be used, for example, in scanner applications. The magnifier lens can also be used as part of a viewfinder system in, for example, a digital or hybrid (digital/film) camera to image a scene displayed on an electronic display to a user's eye for preview and/or review.

Referring to FIGS. 1–7, the terms "front" and "rear" refer to the eye side and object side of the magnifier lens, respectively. In the following examples, 10 is the diaphragm of an eye or other instrument, 20 is a polarizing beam splitter (PBS) or other suitable device for dividing light rays, and 30 is a cover plate protecting an object to be viewed (for example, an image display) 40. The PBS 20 is preferably a partially transmissive/partially reflective device used to illuminate the display front-on via a light source located out of the optical path of the magnifier. Typically, in practice, the PBS 20 (or other beam splitting device, or other light dividing device, etc.) is only necessary for objects to be viewed (for example, image displays) 40 that require front-on illumination.

Although the PBS 20 is shown here as perpendicular to the optical axis 60 of the optical system 50, the PBS 20 is typically tilted at some angle or curved along at least one dimension or both. Additionally, the correction of aberrations due to this non-axially symmetric component would require at least one additional non-axially symmetric feature or component. For these reasons, and with simplicity and cost of the optical system 50 in mind, no attempt to correct aberrations associated with the PBS was made other than inserting the PBS 20 as a thin flat plate oriented perpendicular to the optical axis 60.

The example embodiments of the invention are illustrated in FIGS. 1–7, and Tables 1–7, respectively. In FIGS. 1–7 and Tables 1–7, the surface radii R are numbered beginning at the front side of the magnifier lens 70 ending at the surface of the object to be viewed (for example, an image display surface) 40. In Tables 1–7, the thicknesses of the lens elements and the airspaces between the lens elements are both labeled as "thickness" and are listed on the same line as the surface preceding the thickness. For example, the first thickness in Table 1 corresponds to the distance from the eye diaphragm to the first surface of the first element $E_1$. Similarly, the second thickness in Table 1 corresponds to the thickness of the first element $E_1$ in the system. All thicknesses provided in Tables 1–7 are in millimeters. All indices and V-numbers (also known as Abbe numbers) are for the helium d line of the spectrum at a wavelength of 587:6 nm. Additionally, the example embodiments are color-corrected for the visible spectrum by modeling the photopic response of the human eye using equal weights of 510, 560, and 610 nm light.

A magnifier lens 70 of a first example embodiment is depicted in FIG. 1. This magnifier lens 70 includes two lens elements $E_1$ and $E_2$. The first lens element $E_1$ is a positive power meniscus element concave toward the rear, object side. The front, eye side surface of element $E_1$ is aspheric and the rear, object side surface of element $E_1$ is spherical. The second lens element $E_2$ is a positive power meniscus lens element as well. The front, eye side surface of element $E_2$ is a diffractive and the rear, object side surface of element $E_2$ is aspheric. Elements $E_1$ and $E_2$ are made of plastic and can be molded. The total thickness of the magnifier lens 70, including elements $E_1$ and $E_2$ and the airspace between them, is about 8.6 mm. The total thickness from the front, eye side surface of $E_1$ to the surface of the object to be viewed (for example, an image display surface) 40 is about 16.7 mm.

Figure 2:
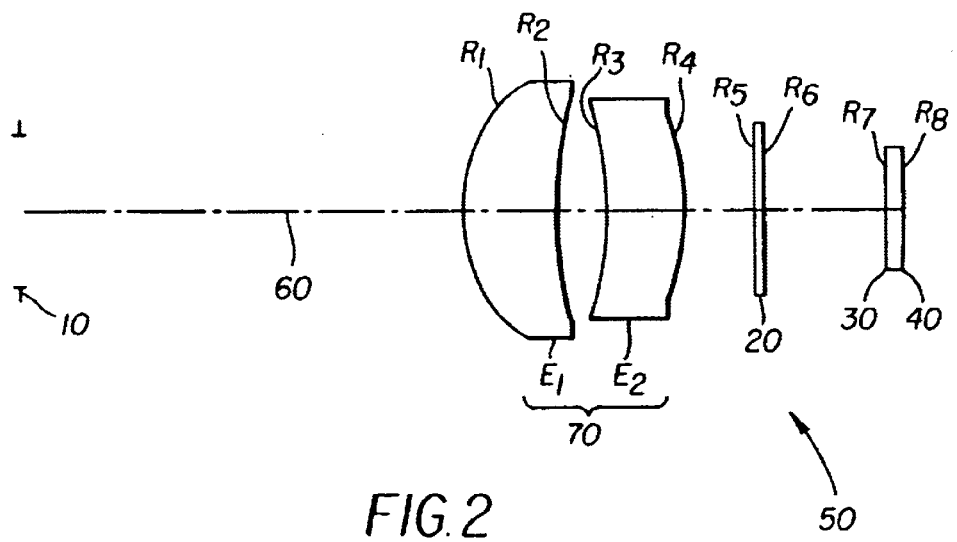
FIG. 2 shows a sectional view of a second embodiment of the magnifier lens system of the first general form.

A magnifier lens 70 of a second example embodiment is depicted in FIG. 2. This magnifier lens 70 includes two lens elements $E_1$ and $E_2$. The first lens element $E_1$ is a positive power meniscus element concave toward the rear, object side. The front, eye side surface of element $E_1$ is spherical and the rear, object side surface of element $E_1$ is aspheric. The second lens element $E_2$ is a positive power meniscus lens element as well. The front, eye side surface of element $E_2$ is a diffractive and the rear, object side surface of element $E_2$ is aspheric. Elements $E_1$ and $E_2$ are made of plastic and can be molded. The total thickness of the magnifier lens 70, including elements $E_1$ and $E_2$ and the airspace between them, is about 8.6 mm. The total thickness from the front, eye side surface of $E_1$ to the surface of the object to be viewed (for example, an image display surface) 40 is about 16.9 mm.

Figure 3:
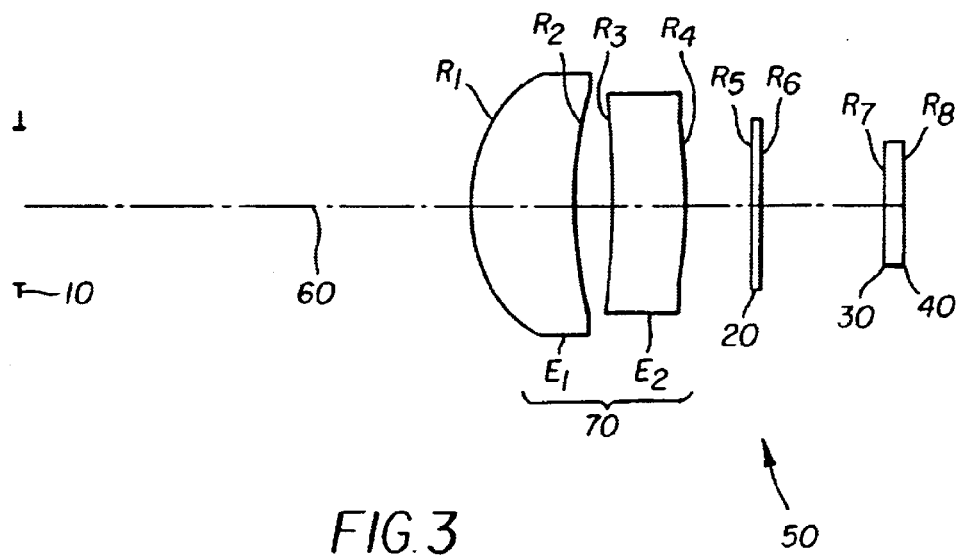
FIG. 3 shows a sectional view of a third embodiment of the magnifier lens system of the first general form.

A magnifier lens 70 of a third example embodiment is depicted in FIG. 3. This magnifier lens 70 includes two lens elements $E_1$ and $E_2$. The first lens element $E_1$ is a positive power meniscus element concave toward the rear, object side. The front, eye side surface of element $E_1$ is aspheric and the rear, object side surface of element $E_1$ is diffractive. The second lens element $E_2$ is a positive power meniscus lens element as well. The front, eye side surface of element $E_2$ is spherical and the rear, object side surface of element $E_2$ is aspheric. Elements $E_1$ and $E_2$ are made of plastic and can be molded. The total thickness of the magnifier lens 70, including these two elements and the airspace between them, is about 8.1 mm. The total thickness from the front, eye side surface of $E_1$ to the surface of the object to be viewed (for example, an image display surface) 40 is about 16.2 mm.

Figure 4:
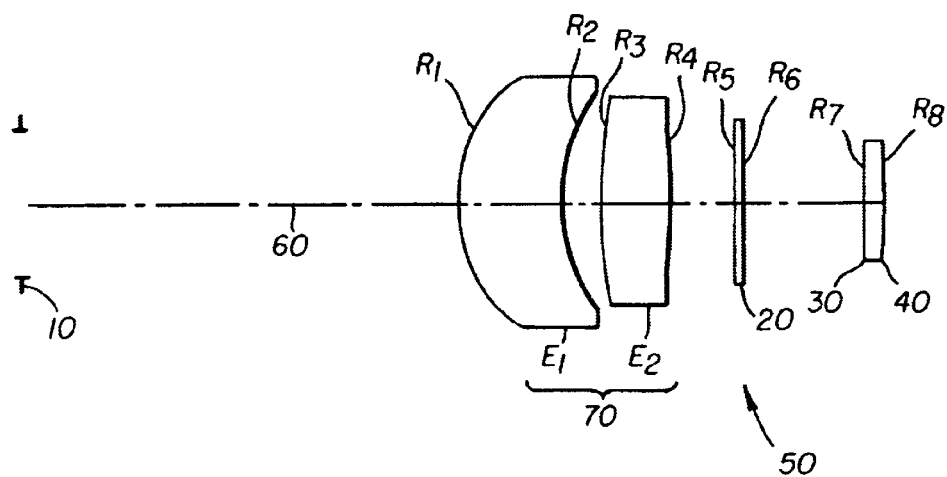
FIG. 4 shows a sectional view of a fourth embodiment of the magnifier lens system of the first general form.

A magnifier lens 70 of a fourth example embodiment is depicted in FIG. 4. This magnifier lens 70 includes two lens elements $E_1$ and $E_2$. The first lens element $E_1$ is a positive power meniscus element concave toward the rear, object side. The front, eye side surface of element $E_1$ is aspheric and the rear, object side surface of element $E_1$ is diffractive. The second lens element $E_2$ is a positive power bi-convex lens element. The front, eye side surface of element $E_2$ is spherical and the rear, object side surface of element $E_2$ is aspheric. Elements $E_1$ and $E_2$ are made of plastic and can be molded. The total thickness of the magnifier lens 70, including these two elements and the airspace between them, is about 8.4 mm. The total thickness from the front, eye side surface of $E_1$ to the surface of the object to be viewed (for example, an image display surface) 40 is about 16.5 mm.

Figure 5:
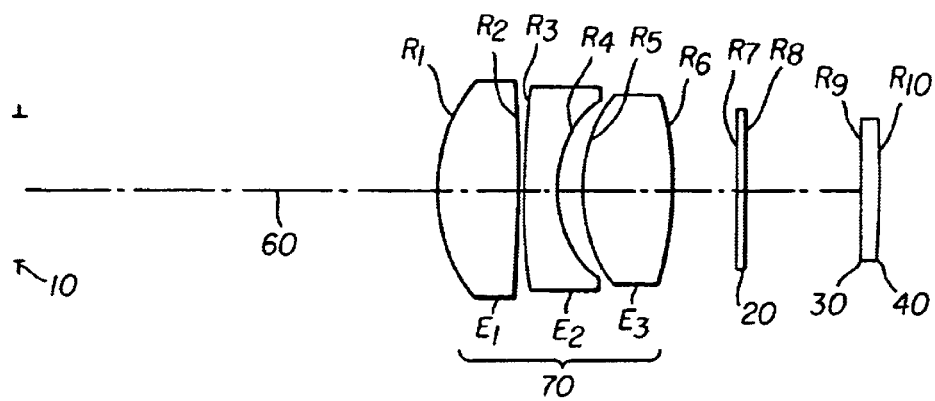
FIG. 5 shows a sectional view of a first embodiment of the magnifier lens system of the second general form.

A magnifier lens 70 of a fifth example embodiment is depicted in FIG. 5. This magnifier lens 70 includes three lens elements $E_1$, $E_2$, and $E_3$. The first lens element $E_1$ is a positive power bi-convex element. The front, eye side surface of element $E_1$ is aspheric (simple conic) and the rear, object side surface of element $E_1$ is spherical. The second lens element $E_2$ is a negative power meniscus lens element convex toward the eye side. The front, eye side surface of element $E_2$ is spherical and the rear, object side surface of element $E_2$ is aspheric (simple conic). The third lens element $E_3$ is a positive power bi-convex element. The front, eye side surface of element $E_3$ is spherical and the rear, object side surface of element $E_3$ is aspheric. Elements $E_1$, $E_2$, and $E_3$ are made of plastic and can be molded. The total thickness of the magnifier lens 70, including these three elements and the airspaces between them, is about 9.8 mm. The total thickness from the front, eye side surface of $E_1$ to the surface of the object to be viewed (for example, an image display surface) 40 is about 17.9 mm.

Figure 6:
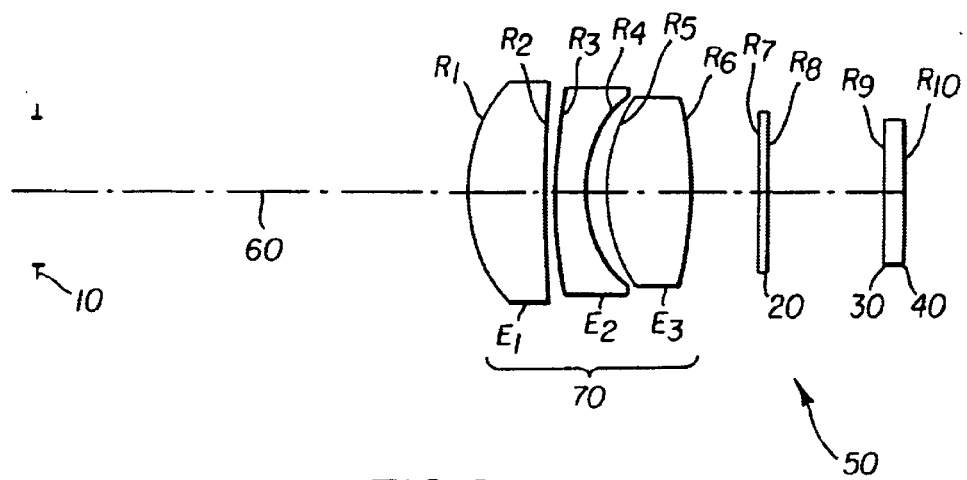
FIG. 6 shows a sectional view of a second embodiment of the magnifier lens system of the second general form.

A magnifier lens 70 of a sixth example embodiment is depicted in FIG. 6. This magnifier lens 70 includes three lens elements $E_1$, $E_2$, and $E_3$. The first lens element $E_1$ is a positive power meniscus element, convex toward the eye side. The front, eye side surface of element $E_1$ is aspheric and the rear, object side surface of element $E_1$ is spherical. The second lens element $E_2$ is a negative power meniscus lens element convex toward the eye side. The front, eye side surface of element $E_2$ is spherical and the rear, object side surface of element $E_2$ is aspheric (simple conic). The third lens element $E_3$ is a positive power bi-convex element. The front, eye side surface of element $E_3$ is spherical and its rear, object side surface is aspheric. Elements $E_1$, $E_2$, and $E_3$ are made of plastic and can be molded. The total thickness of the magnifier lens 70, including these three elements and the airspaces between them, is about 9.5 mm. The total thickness from the front, eye side surface of $E_1$ to the surface of the object to be viewed (for example, an image display surface) 40 is about 17.2 mm.

Figure 7:
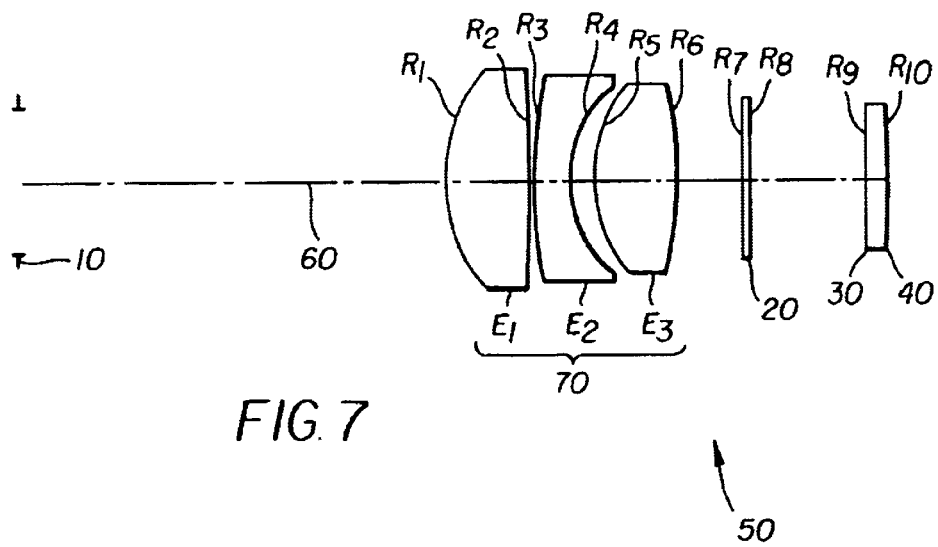
FIG. 7 shows a sectional view of a third embodiment of the magnifier lens system of the second general form.
Figure 8:
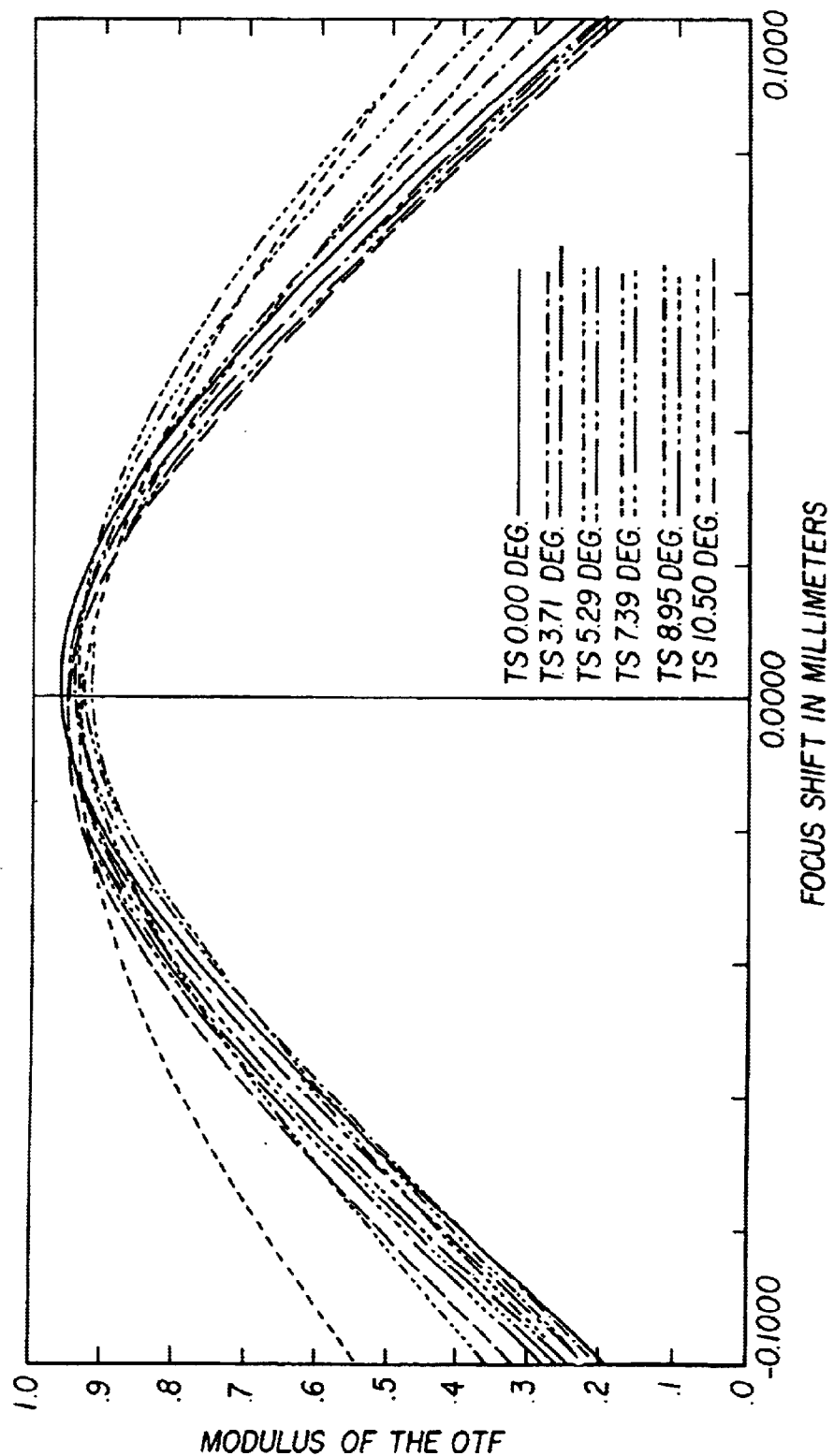
FIG. 8 shows a plot of the through-focus Modulation Transfer Function (MTF) of the magnifier lens illustrated in FIG. 1, the MTF is polychromatic (with equal weights of 510, 560, 610 nm light) at a spatial frequency of 21 line pairs/mm.
Figure 9:
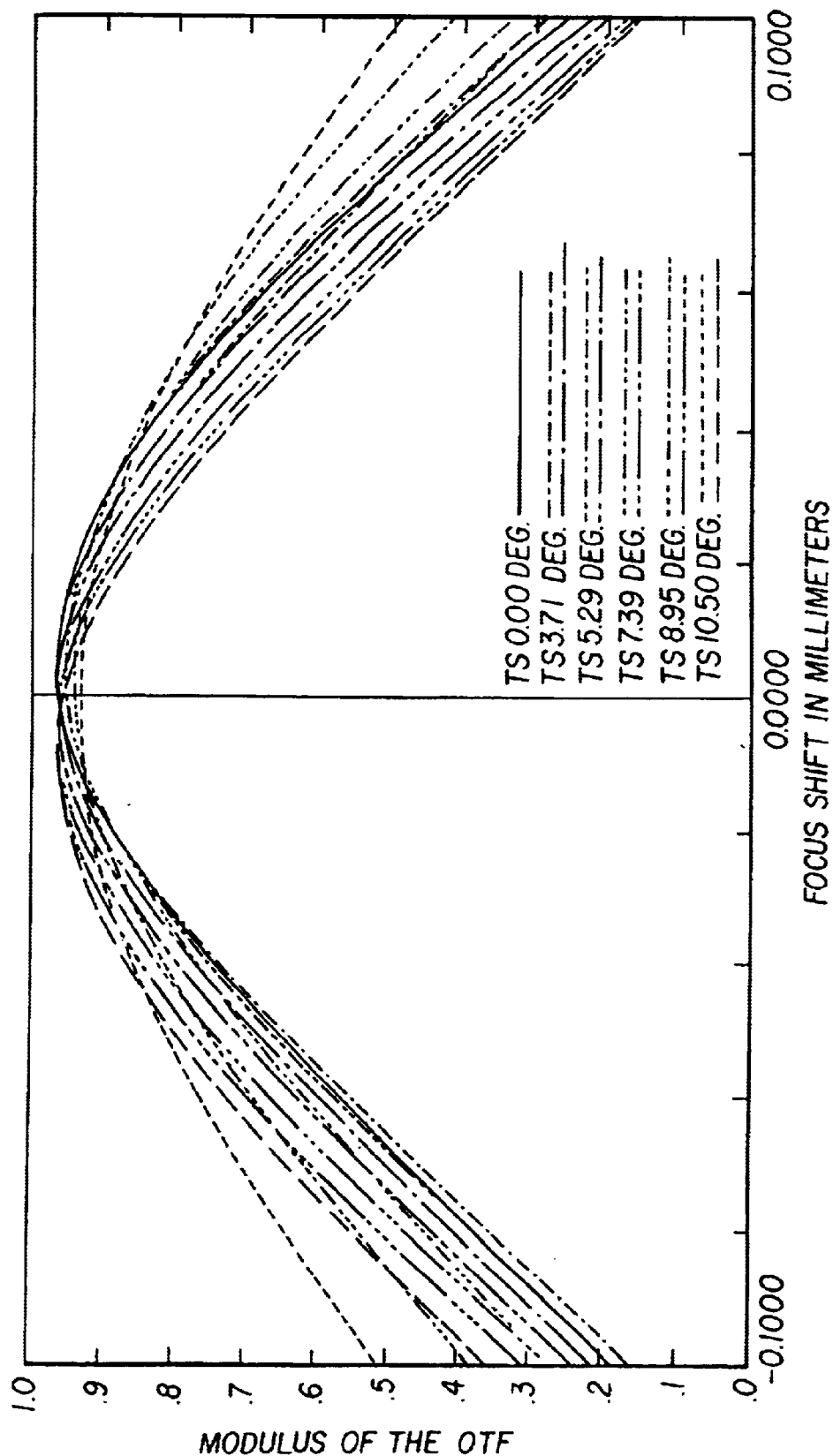
FIG. 9 shows a plot of the through-focus Modulation Transfer Function (MTF) of the magnifier lens illustrated in FIG. 2, the MTF is polychromatic (with equal weights of 510, 560, 610 nm light) at a spatial frequency of 21 line pairs/mm.
Figure 10:
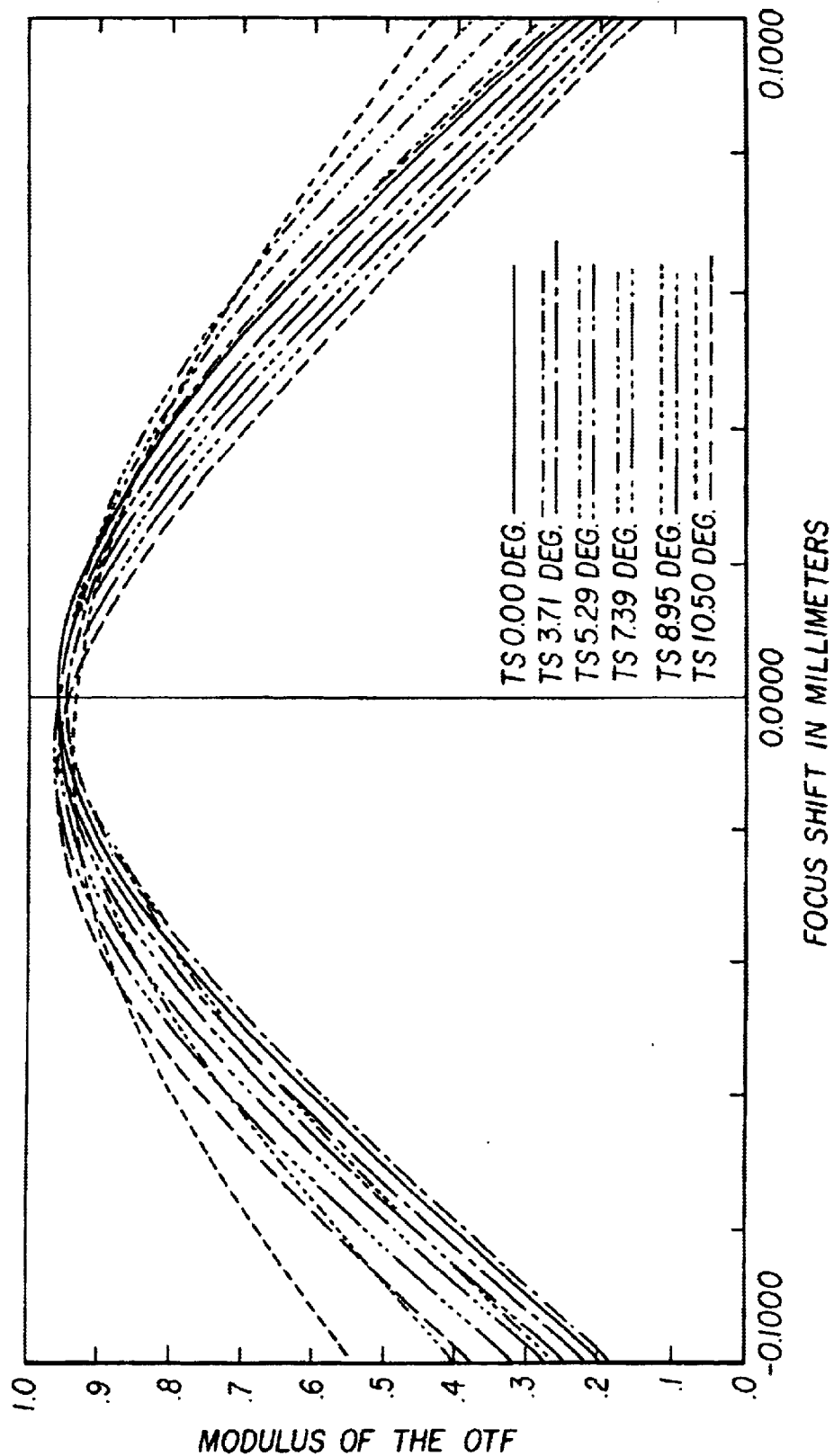
FIG. 10 shows a plot of the through-focus Modulation Transfer Function (MTF) of the magnifier lens illustrated in FIG. 3, the MTF is polychromatic (with equal weights of 510, 560, 610 nm light) at a spatial frequency of 21 line pairs/mm.
Figure 11:
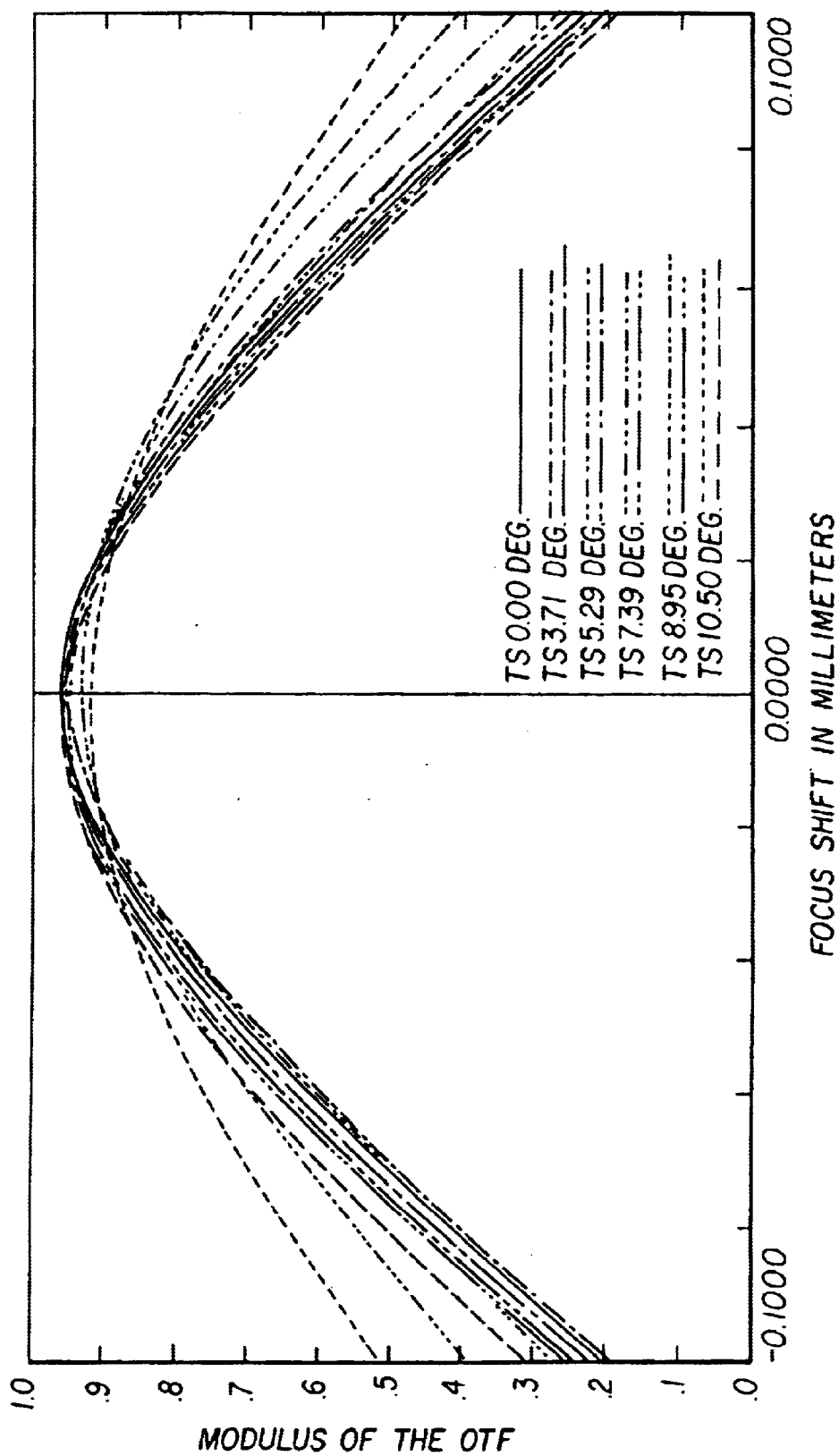
FIG. 11 shows a plot of the through-focus Modulation Transfer Function (MTF) of the magnifier lens illustrated in FIG. 4, the MTF is polychromatic (with equal weights of 510, 560, 610 nm light) at a spatial frequency of 21 line pairs/mm.
Figure 12:
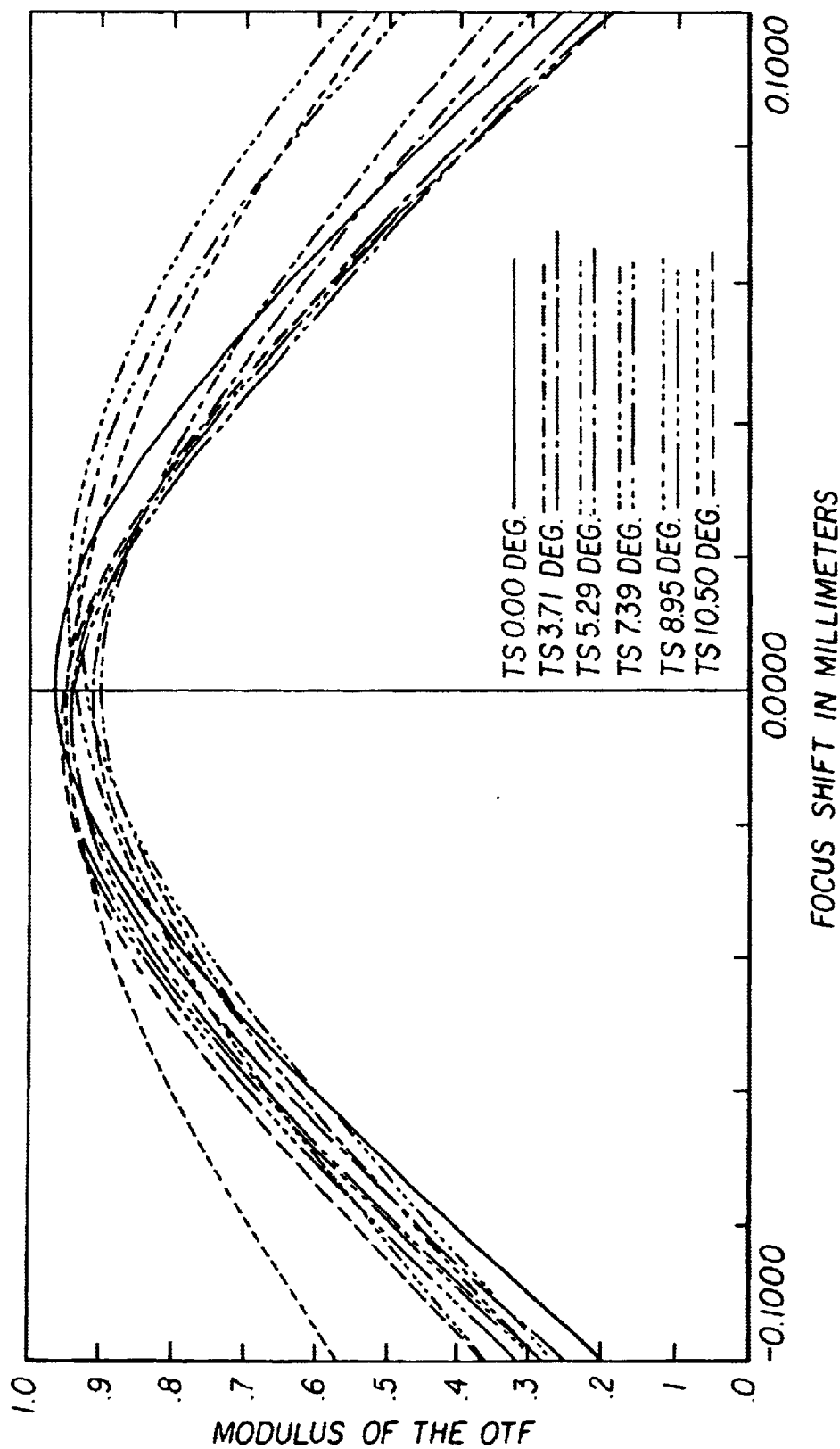
FIG. 12 shows a plot of the through-focus Modulation Transfer Function (MTF) of the magnifier lens illustrated in FIG. 5, the MTF is polychromatic (with equal weights of 510, 560, 610 nm light) at a spatial frequency of 21 line pairs/mm.
Figure 13:
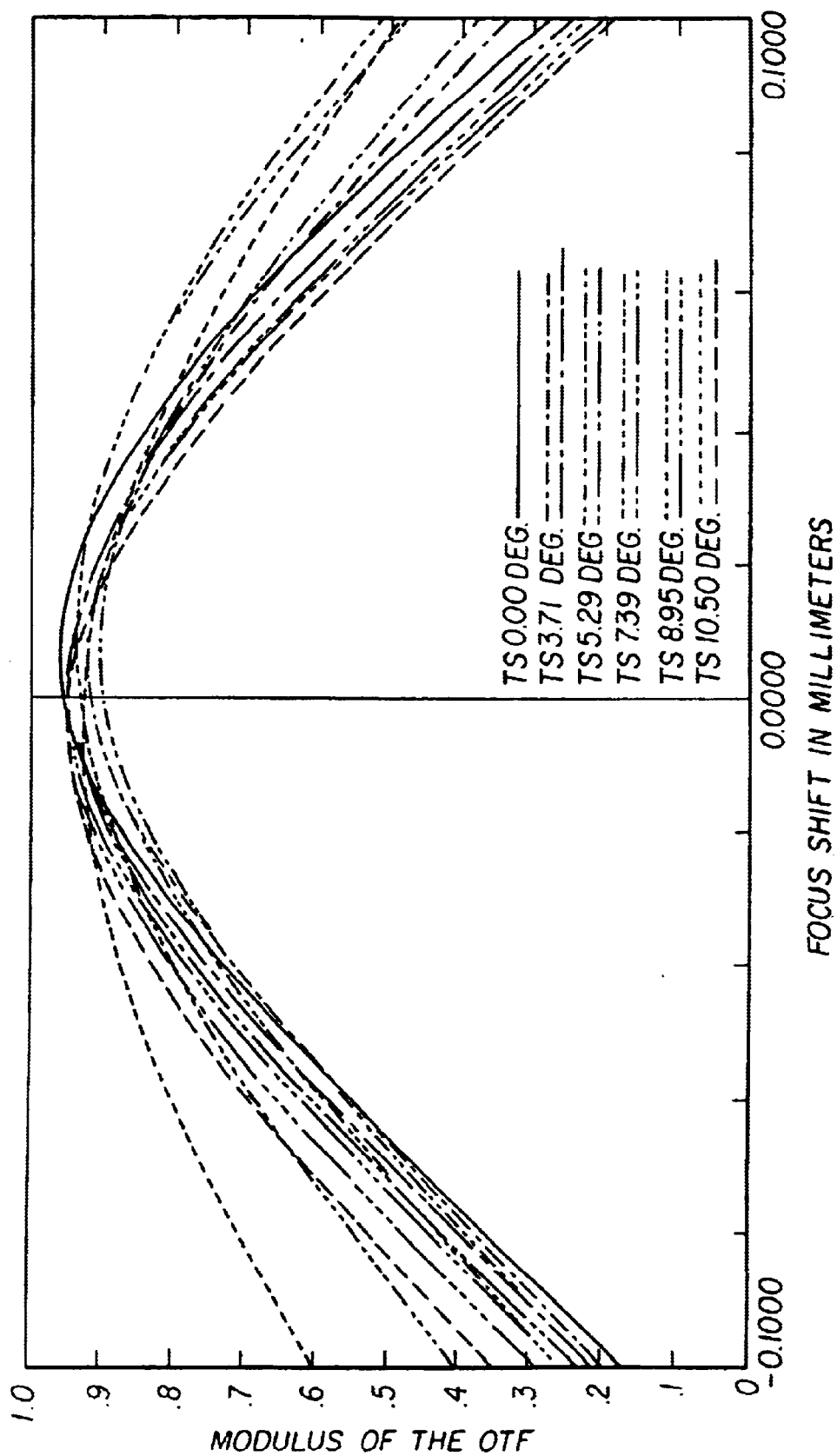
FIG. 13 shows a plot of the through-focus Modulation Transfer Function (MTF) of the magnifier lens illustrated in FIG. 6, the MTF is polychromatic (with equal weights of 510, 560, 610 nm light) at a spatial frequency of 21 line pairs/mm.
Figure 14:
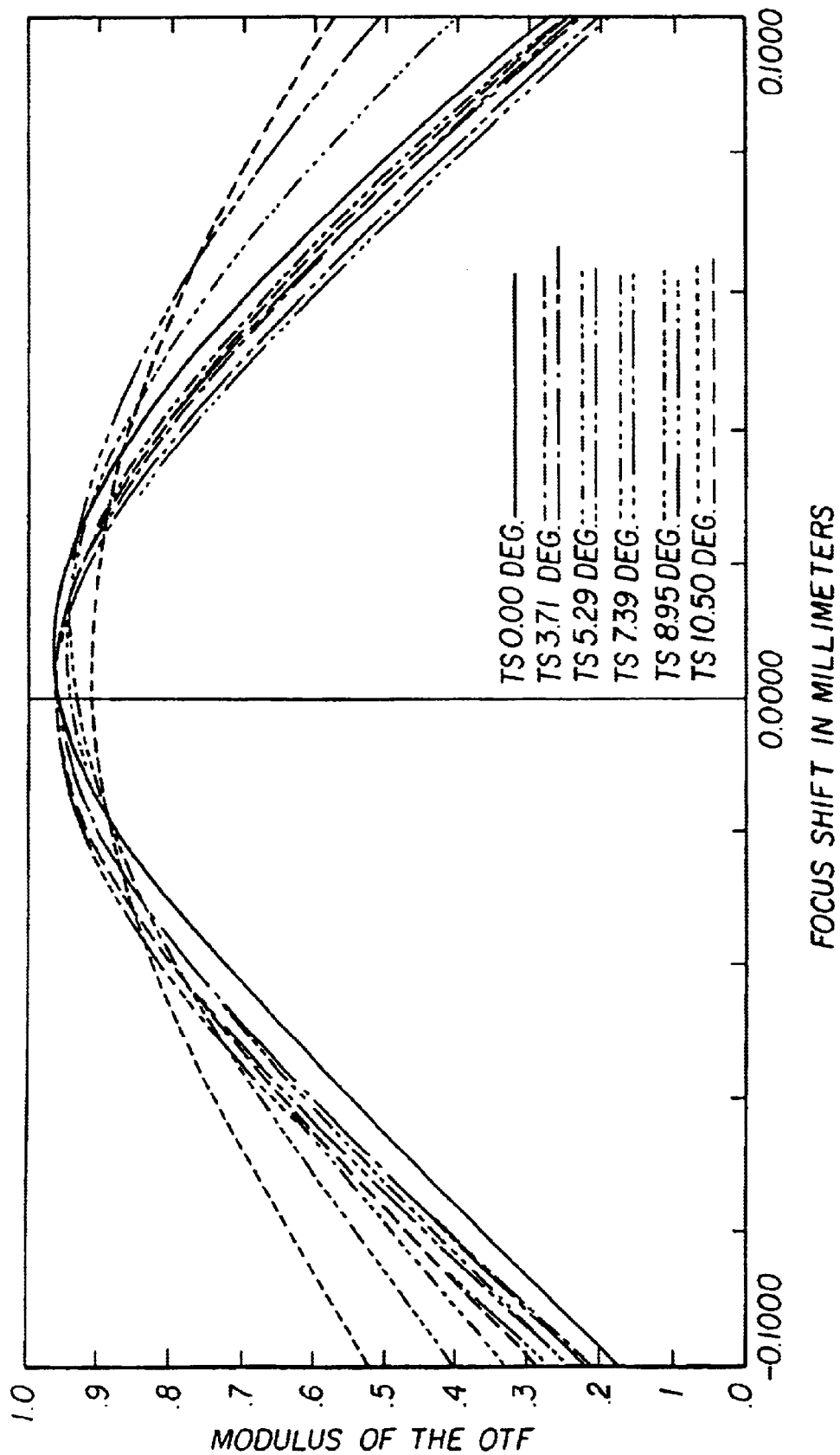
FIG. 14 shows a plot of the through-focus Modulation Transfer Function (MTF) of the magnifier lens illustrated in FIG. 7, the MTF is polychromatic (with equal weights of 510, 560, 610 nm light) at a spatial frequency of 21 line pairs/mm.

A magnifier lens 70 of a seventh example embodiment is depicted in FIG. 7. This magnifier lens 70 includes three lens elements $E_1$, $E_2$, and $E_3$. The first lens element $E_1$ is a positive power bi-convex element. The front, eye side surface of element $E_1$ is aspheric (simple conic) and the rear, object side surface of element $E_1$, is spherical. The second lens element $E_2$ is a negative power meniscus lens element convex toward the eye side. The front, eye side surface of element $E_2$ is spherical and the rear, object side surface of element $E_2$ is aspheric (simple conic). The third lens element $E_2$ is a positive power bi-convex element. The front, eye side surface of element $E_3$ is aspheric and the rear, object side surface of element $E_3$ is spherical. Elements $E_1$, $E_2$, and $E_3$ are made of plastic and can be molded. The total thickness of the magnifier lens 70, including these three elements and the airspaces between them, is about 9.3 mm. The total thickness from the front, eye side surface of $E_1$ to the surface of the object to be viewed (for example, an image display surface) 40 is about 17.6 mm.

The seven example embodiments described above are designed for an object semi-diagonal of 2.4 mm. These embodiments have effective focal lengths between 12.87 mm and 13.05 mm and corresponding magnifications between 19.7× and 19.5×, respectively. Embodiments 1–7 have an apparent field of view of +/–10.5 degrees, an eye relief of 17 mm, and assume a pupil diameter of 6 mm. The resulting relative aperture of embodiments 1–7 is about f/2.2. The seven example embodiments have a maximum distortion (absolute value) <1% and a primary lateral chromatic aberration (absolute value)<3 microns. Additionally, any one or all of the individual lens elements described above can be made using glass in conjunction with a grinding and polishing or molding manufacturing process.

The embodiments described above are suitable for use with LCD-type micro-displays. This is made possible by designing the magnifier lenses 70 to be approximately telecentric on the display side (i.e., chief rays nearly parallel to the optical axis of the system, which is itself parallel to the display surface normal). It is known that doing so reduces perceived brightness falloff toward the corners of the display (which can be substantial with non-telecentric lenses). In embodiments 1–7, the maximum chief ray angle (absolute value) on the display side for all of these embodiments is <3 degrees. Additionally, the embodiments described above are suitable for use with other types of electronic displays and micro-displays, for example, light emitting diode displays such as organic light emitting diode displays, polymeric light emitting diode displays, etc.

Additionally, embodiments 1–7 employ vignetting at the front, eye side surface of the first element $E_1$. Vignetting stops some aberrated rays near the edge of the pupil from reaching off-axis points in the image plane. This increases off-axis image quality at the expense of reduced illumination in the corners of the image relative to that at the center of the image (i.e., relative illumination). Vignetting in the corner of the image is between 25% and 35% for the embodiments described above. This is well within the (generally accepted) 30–40% vignetting that the human eye can tolerate before it becomes noticeable.

It is well known by those skilled in the art of magnifier design that the human eye can accommodate some degree of field curvature by effectively refocusing (the eye) for different parts of the field. The eye can also tolerate some (typically, lesser) degree of astigmatism. Traditionally, when the tangential and sagittal field curves all lie within 1 diopter of the central focus, the image is reasonably well defined over the field. Also, in the absence of astigmatism, a young observer can focus on the field edge and accommodate about 3 diopters for the center. In embodiments 1–7, the image is permitted to curve somewhat, thereby facilitating the reduction of astigmatism in the magnifier lenses 70. The result is essentially just some degree of field curvature (from the lenses) and the astigmatism associated with the PBS 20. For the embodiments described above, the curvature of the field corresponds to an accommodation of <0.6 diopters between the center and the edge of the field.

The through-focus MTF plots shown in FIGS. 8–14 are polychromatic (equal weights of 510 nm, 560 nm, and 610 nm light) for the embodiments depicted in FIGS. 1–7, and Tables 1–7, respectively. The MTF plots are shown for 21 line pairs/mm, half the nyquist frequency for a display with 0.012 mm square pixels. Each MTF plot assumes a curved image surface with radius as given in the prescriptions of Tables 1–7.

It should be noted that for the embodiments in FIGS. 5–7 and Tables 5–7, respectively, the polychromatic MTF performance is substantially the same for equal weights of 450 nm, 550 nm, and 650 nm. For the embodiments in FIGS. 1–4 and Tables 1–4, respectively, the polychromatic MTF performance drops somewhat for equal weights of 450 nm, 550 nm, and 650 nm, but may be recovered quite well with a quick re-optimization.

TABLE 1

| SURF. | CLEAR APER. | RADIUS | THICKNESS | INDEX | V-NUMBER |
|---|---|---|---|---|---|
|  | 6.00 | DIAPHRAGM | 17.000 |  |  |
| 1 | 10.20* | ASPHERE(1) | 3.710 | 1.492 | 57.8 |
| 2 | 9.14 | 16.4892 | 1.900 |  |  |
| 3 | 8.62 | −22.2252(2) | 2.972 | 1.590 | 30.8 |
| 4 | 7.90 | ASPHERE(1) | 2.443 |  |  |
| 5 | 6.79 | PLANO | 0.330 | 1.550 | 55.0 |
| 6 | 6.71 | PLANO | 4.635 |  |  |
| 7 | 4.93 | PLANO | 0.725 | 1.570 | 55.0 |
| 8 | 4.82 | −30.5417 |  |  |  |

*DO NOT EXCEED  LENS LENGTH  8.582
NOTES:
1) ASPHERIC SURFACE DESCRIBED BY SAG EQUATION:

$$X(Y) = \frac{CY^2}{1 + \sqrt{1 - (k+1)C^2Y^2}} + DY^4 + EY^6 + FY^8 + GY^{10} + HY^{12}$$

SURF. 1   $C = 0.1666667$   $D = -0.28952730\text{E}-03$   $F = -0.93959591\text{E}-06$
          $k = 0.0000000$   $E = 0.90649168\text{E}-05$   $G = 0.35556391\text{E}-07$
          VERTEX RADIUS (1/C) = 6.0000                    $H = -0.57183989\text{E}-09$
SURF. 4   $C = -0.0897376$  $D = 0.79693786\text{E}-03$   $F = 0.24127936\text{E}-05$
          $k = 0.0000000$   $E = 0.16847998\text{E}-05$   $G = -0.17226572\text{E}-06$
          VERTEX RADIUS (1/C) = −11.1436                  $H = 0.65623726\text{E}-08$

2) DIFFRACTIVE SURFACE DESCRIBED BY PHASE EQUATION:

$$\Phi(Y) = \frac{2\pi}{\lambda_0}(C_1 Y^2 + C_2 Y^4 + C_3 Y^6 + C_4 Y^8)$$

SURF. 3   $\lambda_0 = 560$ NM   $C_1 = -4.12013\text{E}-03$   $C_3 = -3.46267\text{E}-06$
                                $C_2 = 7.96815\text{E}-05$   $C_4 = 1.07025\text{E}-07$

TABLE 2

| SURF. | CLEAR APER. | RADIUS | THICKNESS | INDEX | V-NUMBER |
|---|---|---|---|---|---|
|  | 6.00 | DIAPHRAGM | 17.000 |  |  |
| 1 | 10.20* | 6.229 | 3.851 | 1.492 | 57.8 |
| 2 | 9.11 | ASPHERE(1) | 1.807 |  |  |
| 3 | 8.69 | −13.0221(2) | 2.946 | 1.590 | 30.8 |

TABLE 2-continued

| | | | | | |
|---|---|---|---|---|---|
| 4 | 8.14 | ASPHERE(1) | 2.594 | | |
| 5 | 6.82 | PLANO | 0.330 | 1.550 | 55.0 |
| 6 | 6.74 | PLANO | 4.635 | | |
| 7 | 4.93 | PLANO | 0.725 | 1.570 | 55.0 |
| 8 | 4.82 | −30.5417 | | | |

*DO NOT EXCEED LENS LENGTH  8.604

NOTES:
3) ASPHERIC SURFACE DESCRIBED BY SAG EQUATION:

$$X(Y) = \frac{CY^2}{1 + \sqrt{1 - (k+1)C^2Y^2}} + DY^4 + EY^6 + FY^8 + GY^{10} + HY^{12}$$

SURF. 2  $C = 0.4044146$  $D = 0.52788255\text{E}{-}03$  $F = 0.48822016\text{E}{-}06$
$k = 0.0000000$  $E = -0.51777047\text{E}{-}05$  $G = -0.48083647\text{E}{-}07$
VERTEX RADIUS (1/C) = 24.7271  $H = 0.36767183\text{E}{-}09$ SURF. 4  $C = -0.1093386$  $D = 0.64198372\text{E}{-}03$  $F = 0.35968081\text{E}{-}05$
$k = 0.0000000$  $E = -0.11253640\text{E}{-}04$  $G = -0.21871596\text{E}{-}06$
VERTEX RADIUS (1/C) = −9.1459  $H = 0.74093706\text{E}{-}08$

4) DIFFRACTIVE SURFACE DESCRIBED BY PHASE EQUATION:

$$\Phi(Y) = \frac{2\pi}{\lambda_0}(C_1 Y^2 + C_2 Y^4 + C_3 Y^6 + C_4 Y^8)$$

SURF. 3  $\lambda_0 = 560$ NM  $C_1 = -4.06429\text{E}{-}03$  $C_3 = -3.73155\text{E}{-}06$
$C_2 = 7.15512\text{E}{-}05$  $C_4 = 1.62241\text{E}{-}07$

TABLE 3

| SURF. | CLEAR APER. | RADIUS | THICKNESS | INDEX | V-NUMBER |
|---|---|---|---|---|---|
| | 6.00 | DIAPHRAGM | 17.000 | | |
| 1 | 10.20* | ASPHERE(1) | 4.091 | 1.492 | 57.8 |
| 2 | 8.95 | 19.2401(2) | 1.264 | | |
| 3 | 8.57 | −39.0234 | 2.750 | 1.590 | 30.8 |
| 4 | 7.56 | ASPHERE(1) | 2.441 | | |
| 5 | 6.63 | PLANO | 0.330 | 1.550 | 55.0 |
| 6 | 6.56 | PLANO | 4.635 | | |
| 7 | 4.92 | PLANO | 0.725 | 1.570 | 55.0 |
| 8 | 4.83 | −30.5417 | | | |

*DO NOT EXCEED LENS LENGTH  8.105

NOTES:
5) ASPHERIC SURFACE DESCRIBED BY SAG EQUATION:

$$X(Y) = \frac{CY^2}{1 + \sqrt{1 - (k+1)C^2Y^2}} + DY^4 + EY^6 + FY^8 + GY^{10} + HY^{12}$$

SURF. 1  $C = 0.1646063$  $D = -0.20370475\text{E}{-}03$  $F = -0.70916812\text{E}{-}06$
$k = 0.0000000$  $E = 0.86070374\text{E}{-}05$  $G = 0.24289232\text{E}{-}07$
VERTEX RADIUS (1/C) = 6.0751  $H = -0.31512663\text{E}{-}09$ SURF. 4  $C = -0.0603912$  $D = 0.95297402\text{E}{-}03$  $F = 0.62224391\text{E}{-}05$
$k = 0.0000000$  $E = -0.15864043\text{E}{-}04$  $G = -0.47132486\text{E}{-}06$
VERTEX RADIUS (1/C) = −16.5587  $H = 0.17717982\text{E}{-}07$

6) DIFFRACTIVE SURFACE DESCRIBED BY PHASE EQUATION:

$$\Phi(Y) = \frac{2\pi}{\lambda_0}(C_1 Y^2 + C_2 Y^4 + C_3 Y^6 + C_4 Y^8)$$

SURF. 2  $\lambda_0 = 560$ NM  $C_1 = -3.32269\text{E}{-}03$  $C_3 = -1.71275\text{E}{-}06$
$C_2 = 4.52118\text{E}{-}05$  $C_4 = 5.78513\text{E}{-}08$

TABLE 4

| SURF. | CLEAR APER. | RADIUS | THICKNESS | INDEX | V-NUMBER |
|---|---|---|---|---|---|
| | 6.00 | DIAPHRAGM | 17.000 | | |
| 1 | 10.20* | ASPHERE(1) | 4.292 | 1.492 | 57.8 |
| 2 | 8.55 | 8.1991(2) | 1.349 | | |
| 3 | 8.38 | 21.6332 | 2.750 | 1.590 | 30.8 |
| 4 | 7.62 | ASPHERE(1) | 2.441 | | |
| 5 | 6.67 | PLANO | 0.330 | 1.550 | 55.0 |

TABLE 4-continued

| | | | | | |
|---|---|---|---|---|---|
| 6 | 6.59 | PLANO | 4.635 | | |
| 7 | 4.93 | PLANO | 0.725 | 1.570 | 55.0 |
| 8 | 4.81 | −30.5417 | | | |

*DO NOT EXCEED    LENS LENGTH    8.393

NOTES:
7) ASPHERIC SURFACE DESCRIBED BY SAG EQUATION:

$$X(Y) = \frac{CY^2}{1 + \sqrt{1 - (k+1)C^2Y^2}} + DY^4 + EY^6 + FY^8 + GY^{10} + HY^{12}$$

SURF. 1    C = 0.1682086    D = −0.36386441E−03    F = −0.13188881E−05
           k = 0.0000000    E = 0.12936727E−04    G = 0.50574451E−07
           VERTEX RADIUS (1/C) = 5.945    H = −0.93964616E−09
SURF. 4    C = −0.0426814    D = 0.71989155E−03    F = 0.27592984E−05
           k = 0.0000000    E = −0.41520397E−05    G = −0.20084234E−06
           VERTEX RADIUS (1/C) = −23.4294    H = 0.85266176E−08

8) DIFFRACTIVE SURFACE DESCRIBED BY PHASE EQUATION:

$$\Phi(Y) = \frac{2\pi}{\lambda_0}(C_1 Y^2 + C_2 Y^4 + C_3 Y^6 + C_4 Y^8)$$

SURF. 2    $\lambda_0$ = 560 NM    $C_1$ = −3.74332E−03    $C_3$ = 4.01070E−06
                                   $C_2$ = −5.34761E−05    $C_4$ = −4.14056E−08

TABLE 5

| SURF. | CLEAR APER. | RADIUS | THICKNESS | INDEX | V-NUMBER |
|---|---|---|---|---|---|
|  | 6.00 | DIAPHRAGM | 17.000 | | |
| 1 | 9.10* | ASPHERE(1) | 3.380 | 1.492 | 57.8 |
| 2 | 8.73 | −104.3823 | 0.181 | | |
| 3 | 8.52 | 32.1466 | 1.449 | 1.583 | 30.1 |
| 4 | 7.57 | ASPHERE(1) | 1.053 | | |
| 5 | 7.99 | 6.9618 | 3.698 | 1.492 | 57.8 |
| 6 | 7.85 | ASPHERE(1) | 2.444 | | |
| 7 | 6.73 | PLANO | 0.330 | 1.550 | 55.0 |
| 8 | 6.66 | PLANO | 4.635 | | |
| 9 | 4.95 | PLANO | 0.725 | 1.570 | 55.0 |
| 10 | 4.82 | −28.7621 | | | |

*DO NOT EXCEED    LENS LENGTH    9.761

NOTES:
1) ASPHERIC SURFACE DESCRIBED BY SAG EQUATION:

$$X(Y) = \frac{CY^2}{1 + \sqrt{1 - (k+1)C^2Y^2}} + DY^4 + EY^6 + FY^8 + GY^{10} + HY^{12}$$

SURF. 1    C = 0.1582487    D = 0.0000000E+00    F = 0.0000000E+00
           k = −1.2126760    E = 0.0000000E+00    G = 0.0000000E+00
           VERTEX RADIUS (1/C) = 6.3194    H = 0.0000000E+00
SURF. 4    C = 0.2284044    D = 0.0000000E+00    F = 0.0000000E+00
           k = −0.7743398    E = 0.0000000E+00    G = 0.0000000E+00
           VERTEX RADIUS (1/C) = 4.3782    H = 0.0000000E+00
SURF. 6    C = −0.0868644    D = 0.4399801E−03    F = −0.3529413E−06
           k = 0.0000000    E = 0.4799854E−05    G = 0.8495183E−08
           VERTEX RADIUS (1/C) = −11.5122    H = 0.0000000E+00

TABLE 6

| SURF. | CLEAR APER. | RADIUS | THICKNESS | INDEX | V-NUMBER |
|---|---|---|---|---|---|
|  | 6.00 | DIAPHRAGM | 17.000 | | |
| 1 | 9.10* | ASPHERE(1) | 3.188 | 1.492 | 57.8 |
| 2 | 8.69 | 95.4845 | 0.335 | | |
| 3 | 8.50 | 26.9536 | 1.280 | 1.583 | 30.1 |
| 4 | 7.66 | ASPHERE(1) | 0.744 | | |
| 5 | 7.82 | 7.1693 | 3.314 | 1.492 | 57.8 |
| 6 | 7.61 | ASPHERE(1) | 2.657 | | |
| 7 | 6.56 | PLANO | 0.330 | 1.550 | 55.0 |
| 8 | 6.49 | PLANO | 4.635 | | |

TABLE 6-continued

| | | | | | |
|---|---|---|---|---|---|
| 9 | 4.94 | PLANO | 0.725 | 1.570 | 55.0 |
| 10 | 4.82 | −28.9000 | | | |

*DO NOT EXCEED LENS LENGTH  8.861

NOTES:
2) ASPHERIC SURFACE DESCRIBED BY SAG EQUATION:

$$X(Y) = \frac{CY^2}{1 + \sqrt{1 - (k+1)C^2Y^2}} + DY^4 + EY^6 + FY^8 + GY^{10} + HY^{12}$$

SURF. 1   C =  0.1627657      D = −0.9597174E−05     F =  0.8515111E−07
          k = −1.0784800      E =  0.6443622E−07     G = −0.8389589E−09
          VERTEX RADIUS (1/C) = 6.1438              H =  0.0000000E+00
SURF. 4   C =  0.2147075      D =  0.0000000E+00     F =  0.0000000E+00
          k = −0.9062283      E =  0.0000000E+00     G =  0.0000000E+00
          VERTEX RADIUS (1/C) = 4.6575              H =  0.0000000E+00
SURF. 6   C = −0.0832591      D =  0.6436675E−03     F = −0.3216570E−06
          k =  0.0000000      E =  0.7271238E−05     G =  0.2184924E−07
          VERTEX RADIUS (1/C) = −12.0107             H =  0.0000000E+00

TABLE 7

| SURF. | CLEAR APER. | RADIUS | THICKNESS | INDEX | V-NUMBER |
|---|---|---|---|---|---|
| | 6.00 | DIAPHRAGM | 17.000 | | |
| 1 | 9.10* | ASPHERE(1) | 3.339 | 1.492 | 57.8 |
| 2 | 8.74 | −224.8469 | 0.210 | | |
| 3 | 8.54 | 26.8436 | 1.423 | 1.583 | 30.1 |
| 4 | 7.61 | ASPHERE(1) | 0.939 | | |
| 5 | 7.85 | ASPHERE(1) | 3.574 | 1.492 | 57.8 |
| 6 | 7.71 | −16.4096 | 2.444 | | |
| 7 | 6.64 | PLANO | 0.330 | 1.550 | 55.0 |
| 8 | 6.56 | PLANO | 4.635 | | |
| 9 | 4.91 | PLANO | 0.725 | 1.570 | 55.0 |
| 10 | 4.81 | −28.7621 | | | |

*DO NOT EXCEED LENS LENGTH  9.485

NOTES:
3) ASPHERIC SURFACE DESCRIBED BY SAG EQUATION:

$$X(Y) = \frac{CY^2}{1 + \sqrt{1 - (k+1)C^2Y^2}} + DY^4 + EY^6 + FY^8 + GY^{10} + HY^{12}$$

SURF. 1   C =  0.1609088      D =  0.0000000E+00     F =  0.0000000E+00
          k = −1.3568420      E =  0.0000000E+00     G =  0.0000000E+00
          VERTEX RADIUS (1/C) = 6.2147              H =  0.0000000E+00
SURF. 4   C =  0.2735529      D =  0.0000000E+00     F =  0.0000000E+00
          k = −1.5674930      E =  0.0000000E+00     G =  0.0000000E+00
          VERTEX RADIUS (1/C) = 3.6556              H =  0.0000000E+00
SURF. 5   C =  0.2075765      D = −0.2473807E−02     F =  0.6771738E−06
          k =  0.0000000      E = −0.1801932E−04     G = −0.1057451E−06
          VERTEX RADIUS (1/C) = 4.8616              H =  0.0000000E+00

The invention has been described in detail with particular reference to certain preferred embodiments thereof, but it will be understood that variations and modifications can be effected within the scope of the invention.

What is claimed is:

1. A magnifier lens comprising in order from an eye side:
a first positive power meniscus lens element having an eye side surface and an object side surface, at least one of the eye side surface and the object side surface being aspheric; and
a second positive power lens element having an aspheric object side surface convex toward the object side and an eye side surface, wherein at least one of the object side surface of the first positive power meniscus element and the eye side surface of the second positive power element is diffractive.

2. The lens of claim 1, wherein the second positive power lens element is meniscus.

3. The lens of claim 2, wherein the second positive power meniscus lens element is concave toward the eye side.

4. The lens of claim 1, wherein the second positive power lens element is bi-convex.

5. The lens of claim 1, wherein the first positive power meniscus lens element is convex toward the eye side.

6. An optical system comprising in order from an eye side:
a first positive power meniscus lens element having an eye side surface and an object side surface, at least one of the eye side surface and the object side surface being aspheric;
a second positive power lens element having an aspheric object side surface convex toward the object side and an eye side surface, wherein at least one of the object side surface of the first positive power meniscus element and the eye side surface of the second positive power element is diffractive; and an object to be viewed.

7. The optical system of claim 6, wherein a back focal length in air from the object side surface of the second positive power lens element to the object to be viewed is no less than about 7.7 mm.

8. The optical system of claim 6, further comprising:
a cover glass positioned on an eye side of the object to be viewed; and
a beam splitter positioned between the object side surface of the second positive power lens element and the cover glass, wherein the object side surface of the second positive power lens element is positioned about 8.1 mm from the object to be viewed.

9. The optical system of claim 6, wherein the object to be viewed is an electronic display.

10. The optical system of claim 9, wherein the electronic display is a liquid crystal display.

11. The optical system of claim 9, wherein the electronic display has a full diagonal of approximately 6 mm or less.

12. The optical system of claim 9, wherein the electronic display is a micro-display.

13. The optical system of claim 9, wherein the electronic display is a light emitting diode display.

14. The optical system of claim 13, wherein the light emitting diode display is an organic light emitting diode display.

15. The optical system of claim 13, wherein the light emitting diode display is a polymeric light emitting diode display.

16. The optical system of claim 6, the first and second lens elements comprising a magnifier lens having an object side positioned proximate to the object to be viewed, wherein the magnifier lens is adapted to be approximately telecentric on the object side of the magnifier lens.

17. The optical system of claim 6, wherein a length in air from any location on the object side surface of the second positive power lens element to the object to be viewed is no less than about 7.7 mm.

18. A magnifier lens comprising in order from an eye side:
a first positive power lens element having an aspheric surface; and
a second positive power lens element having an aspheric surface, the second positive power lens element having an object side surface, the object side surface having a most object side point, the magnifier lens having an effective focal length, wherein a distance from the most object side point on the object side surface of the second positive power lens element to an object to be viewed is greater than 0.38 times the effective focal length of the magnifier lens.

19. The magnifier lens of claim 18, the magnifier lens having a back focal length in air, wherein the back focal length in air is greater than or equal to 7.7 mm.

20. The magnifier lens of claim 18, the magnifier lens having an eye relief, wherein the eye relief is greater than the effective focal length.

21. The magnifier lens of claim 20, wherein the eye relief is greater than 1.3 times the effective focal length.

22. The magnifier lens of claim 18, the magnifier lens having a magnification, wherein the magnification is at least 15×.

23. The magnifier lens of claim 22, wherein the magnification is greater than 19×.

24. The magnifier lens of claim 18, the magnifier lens having an eye relief, wherein the eye relief is at least 17 mm.

25. The magnifier lens of claim 18, the magnifier lens having an apparent field of view, wherein the apparent field of view is at least +/−10 degrees.

26. The magnifier lens of claim 18, wherein the first and second positive lens elements are made from plastic.

27. The magnifier lens of claim 18, further comprising:
a negative power lens element positioned between the first and second positive power lens elements, the negative power lens element having an aspheric surface.

28. The magnifier lens of claim 27, wherein the negative power lens element is made from plastic.

29. The magnifier lens of claim 27, wherein at least two of the aspheric surfaces are simple conics.

30. The magnifier lens of claim 29, the first positive power lens element having an eye side surface, the eye side surface being the simple conic.

31. The magnifier lens of claim 29, the second negative power lens element having a object side surface, the object side surface being the simple conic.

32. The magnifier lens of claim 27, wherein the second negative power lens element is meniscus.

33. The magnifier lens of claim 27, wherein the third positive power lens element is bi-convex.

34. The magnifier lens of claim 27, the magnifier lens having a back focal length in air, wherein the back focal length is greater than 0.38 times the effective focal length.

35. The magnifier lens of claim 27, the magnifier lens having a back focal length in air, wherein the back focal length is greater than 0.59 times the effective focal length.

36. The magnifier lens of claim 27, each lens element of the magnifier lens having a center thickness and an edge thickness, wherein a ratio of center thickness to edge thickness of each lens element is between 0.5 and 2.0.

37. The magnifier lens of claim 27, the magnifier lens having a total thickness from the eye side surface of the first lens element to a surface of a viewable object, wherein the total thickness is less than 17.9 mm.

38. The magnifier lens of claim 27, the magnifier lens having a total thickness from the eye side surface of the first lens element to a surface of a viewable object, wherein the total thickness is less than 1.40 times the effective focal length.

39. A magnifier lens comprising in order from an eye side:
a first positive power lens element having an aspheric surface and
a second positive power lens element having an aspheric surface, the magnifier lens having a back focal length in air, wherein the back focal length of the magnifier lens in air is greater than 5 mm and at least one of the positive power lens elements includes a diffractive surface.

40. The magnifier lens of claim 39, the first positive power lens element having an object side surface, wherein the diffractive is on the object side surface of the first positive power lens element.

41. The magnifier lens of claim 39, the second positive power lens element having an eye side surface, wherein the diffractive is on the eye side surface of the second positive power lens element.

42. The magnifier lens of claim 39, the second positive power lens element having an object side surface, wherein the object side surface of the second positive power lens element is convex toward the object side.

43. The magnifier lens of claim 42, wherein the object side surface of the second positive power lens element is aspheric.

44. The magnifier lens of claim 39, wherein the first positive power lens element is meniscus.

45. The magnifier lens of claim 39, wherein the second positive power lens element is bi-convex.

46. The magnifier lens of claim 39, the diffractive surface having zone spacing, wherein the zone spacing is at least 20 microns.

47. The magnifier lens of claim 18, the magnifier lens having an object side positionable proximate to an object to be viewed, wherein the magnifier lens is adapted to be approximately telecentric on the object side of the magnifier lens.

48. The magnifier lens of claim 18, the magnifier lens having a back focal length in air, wherein the back focal length is greater than 0.38 times the effective focal length.

49. The magnifier lens of claim 18, the magnifier lens having a back focal length in air, wherein the back focal length is greater than 0.59 times the effective focal length.

50. The magnifier lens of claim 18, each lens element of the magnifier lens having a center thickness and an edge thickness, wherein a ratio of center thickness to edge thickness of each lens element is between 0.9 and 2.1.

51. The magnifier lens of claim 18, the magnifier lens having a total thickness from the eye side surface of the first lens element to a surface of a viewable object, wherein the total thickness is less than 17.0 mm.

52. The magnifier lens of claim 18, the magnifier lens having a total thickness from the eye side surface of the first lens element to a surface of a viewable object, wherein the total thickness is less than 1.33 times the effective focal length.

53. A magnifier lens comprising in order from an eye side:
   a first positive power lens element having an aspheric surface; and
   a second positive power lens element having an aspheric surface, the magnifier lens having a back focal length in air, an eye relief, and an effective focal length, wherein the back focal length of the magnifier lens in air is greater than 5 mm and the eye relief is greater than the effective focal length.

54. The magnifier lens of claim 53, wherein the eye relief is greater than 1.3 times the effective focal length.

55. A magnifier lens comprising in order from an eye side:
   a first positive power lens element having an aspheric surface; and
   a second positive power lens element having an aspheric surface, the magnifier lens having a back focal length in air and an effective focal length, wherein the back focal length of the magnifier lens in air is greater than 5 mm and wherein the back focal length is greater than 0.3 8 times the effective focal length.

56. The magnifier lens of claim 55, wherein the back focal length is greater than 0.59 times the effective focal length.

57. A magnifier lens comprising in order from an eye side:
   a first positive power lens element having an aspheric surface;
   a negative power lens element having an aspheric surface; and
   a second positive power lens element having an aspheric surface, the magnifier lens having a back focal length in air and an effective focal length, wherein the back focal length of the magnifier lens in air is greater than 5 mm and the back focal length is greater than 0.38 times the effective focal length.

58. The magnifier lens of claim 57, wherein the back focal length is greater than 0.59 times the effective focal length.

59. A magnifier lens comprising in order from an eye side:
   a first positive power lens element having an aspheric surface;
   a negative power lens element having an aspheric surface; and
   a second positive power lens element having an aspheric surface, the magnifier lens having a back focal length in air, an effective focal length, and a total thickness from the eye side surface of the first lens element to a surface of a viewable object, wherein the back focal length of the magnifier lens in air is greater than 5 mm and the total thickness is less than 1.40 times the effective focal length.

60. A magnifier lens comprising in order from an eye side:
   a first positive power lens element having an aspheric surface; and
   a second positive power lens element having an aspheric surface, the magnifier lens having a back focal length in air, an effective focal length, and a total thickness from the eye side surface of the first lens element to a surface of a viewable object, wherein the back focal length of the magnifier lens in air is greater than 5 mm and the total thickness is less than 1.33 times the effective focal length.

* * * * *